(12) United States Patent
Chen et al.

(10) Patent No.: US 10,488,037 B2
(45) Date of Patent: Nov. 26, 2019

(54) COMBUSTIBLE SKY LANTERN AND BASE FRAME THEREOF

(71) Applicant: Tshu-bi Co., Ltd., Taipei (TW)

(72) Inventors: Yu-Cheng Chen, Taipei (TW); Yu-Jung Chen, Taipei (TW)

(73) Assignee: TSHU-BI CO., LTD., Taipei (TW)

( * ) Notice: Subject to any disclaimer, the term of this patent is extended or adjusted under 35 U.S.C. 154(b) by 0 days.

(21) Appl. No.: 16/185,517

(22) Filed: Nov. 9, 2018

(65) Prior Publication Data

US 2019/0170343 A1 Jun. 6, 2019

(30) Foreign Application Priority Data

Dec. 5, 2017 (TW) .............................. 106218066 U

(51) Int. Cl.
| | |
|---|---|
| *F21L 19/00* | (2006.01) |
| *F21V 37/00* | (2006.01) |
| *F21V 3/02* | (2006.01) |
| *B64B 1/40* | (2006.01) |
| *F21V 1/18* | (2006.01) |
| *F21L 26/00* | (2006.01) |
| *F21V 1/02* | (2006.01) |

(52) U.S. Cl.
CPC ................ *F21V 37/00* (2013.01); *B64B 1/40* (2013.01); *F21L 26/00* (2013.01); *F21V 1/02* (2013.01); *F21V 1/18* (2013.01); *F21V 3/023* (2013.01)

(58) Field of Classification Search
CPC .. B64B 1/40–64; F21L 26/00; F21V 1/02–08; F21V 1/18; F21V 3/02–026; F21V 37/00–0095
USPC ......................................... 362/159–163, 447
See application file for complete search history.

(56) References Cited

FOREIGN PATENT DOCUMENTS

GB           2490259 A  * 10/2012  .............. F21V 3/023

* cited by examiner

*Primary Examiner* — Jason M Han
(74) *Attorney, Agent, or Firm* — Muncy, Geissler, Olds & Lowe, P.C.

(57) ABSTRACT

A combustible sky lantern includes a combustible base frame and a combustible hot air balloon. The combustible base frame includes a combustion carrier and an envelope-connecting rim. The combustion carrier combustion carrier is used for positioning fixedly a combustible object to be ignited as a flame source. The envelope-connecting rim is connected with the combustion carrier. The combustible hot air balloon, fixed to the envelope-connecting rim, is to contain thereinside a heated air generated by burning the combustible object. After a fire at the combustible object spreads to the combustion carrier, the fire would further spread orderly to the envelope-connecting rim and the combustible hot air balloon.

16 Claims, 7 Drawing Sheets

COMBUSTIBLE SKY LANTERN AND BASE FRAME THEREOF

BACKGROUND OF THE INVENTION

1. FIELD OF THE INVENTION

The invention relates to a sky lantern, and more particularly to a combustible sky lantern and a combustible base frame of the combustible sky lantern.

2. DESCRIPTION OF THE PRIOR ART

Generally speaking, at some famous scenic spots or in some specific festivals, releasing a sky lantern is a popular activity for celebration and/or fortune wishing. For example, at Pingxi Taiwan, releasing the sky lantern is essentially the major attraction to the world; especially, in the lantern festival.

Definitely, releasing the sky lantern can bring people joy. However, in an entire process of releasing the sky lantern, a simple combustible object is firstly placed inside the sky lantern, then the combustible object is burned to generate heated air for inflating an envelope of the sky lantern, and gradually the envelope could be inflated to a stage that the sky lantern can fly. Inevitably, the sky lantern would finally fall as soon as the combustible object is burned out. Since the sky lantern is generally released outdoors, thus after it fell, a recycle problem would be arisen to affect the natural environment. Even worse, the residue of the sky lantern may harm wild animals to some degree.

Referring now to FIG. 1, a schematic perspective view of a conventional sky lantern in shown. This conventional sky lantern PA100 includes a base frame PA1 and an envelope PA2. The base frame PA1 is furnished with a fixation structure PA11 at a center thereof, and the envelope PA2 is connected firmly with the base frame PAL Thereupon, a combustible object PA200 can be mounted onto the fixation structure PA11. By burning the combustible object PA200 to heat up the surrounding air, the entire sky lantern PA100 can fly by the heated air inside the envelope PA2.

In the art, the base frame PA1 is usually made of bamboo, while the envelope PA2 is made of paper. In addition, metal wires are generally used to tie the base frame PA1 and the envelope PA2 together. Thus, if the sky lantern is dead somewhere in a wild field, the metal wires tying the base frame PA1 and the envelope PA2 would never decompose into dirt, unlike the base frame PA1 and the envelope PA2 do, even after a long time. Namely, even the the base frame PA1 and the envelope PA2 of the residue lantern could be gradually decomposed with time, yet the metal wires connecting the two foregoing parts would remain in the nature.

In addition, though the bamboo-made base frame PA1 and the paper-made envelope PA2 can be naturally decomposed into dirt, yet the time to complete the decomposition is extremely long, and definitely ill effects upon the environment during the whole course are inevitable.

SUMMARY OF THE INVENTION

In viewing that the conventional sky lantern is mainly consisted of the bamboo-made base frame, the paper-made envelope and the metal wires, and that the residue of the sky lantern left after the combustible object is burned out would definitely harm the natural environment to some degree, accordingly it is an object of the present invention to provide a combustible sky lantern that is particularly structured to minimize its residue to impact the natural environment.

In the present invention, the combustible sky lantern includes a combustible base frame and a combustible hot air balloon. The combustible base frame includes a combustion carrier and an envelope-connecting rim. The combustion carrier combustion carrier is used for positioning fixedly a combustible object to be ignited as a flame source. The envelope-connecting rim is connected with the combustion carrier. The combustible hot air balloon, fixed to the envelope-connecting rim, is to contain thereinside a heated air generated by burning the combustible object. After a fire at the combustible object spreads to the combustion carrier, the fire would further spread orderly to the envelope-connecting rim and the combustible hot air balloon.

In one embodiment of the present invention, the combustion carrier includes a central holder, a plurality of first connection ribs and a ring section. The central holder has a combustion positioner for positioning fixedly the combustible object. The plurality of first connection ribs are connected individually with the central holder. The ring section, surrounding the central holder, is connected with the plurality of first connection ribs and the envelope-connecting rim in a manner of locating between the plurality of first connection ribs and the envelope-connecting rim.

Preferably, the plurality of first connection ribs integrate the central holder and the ring section as a unique piece. The combustion positioner is formed as a cone-shaped structure for piercing the combustible object. The envelope-connecting rim includes an annular edge frame and a plurality of second connection ribs. The annular edge frame is connected with the combustible hot air balloon. The plurality of second connection ribs are connected with the annular edge frame and the ring section in a manner of locating between the annular edge frame and the ring section.

Further, the plurality of second connection ribs integrate the annular edge frame and the ring section as a unique piece; each of the plurality of first connection ribs has a first width, each of the plurality of second connection ribs has a second width, and the first width is greater than the second width; and, the plurality of first connection ribs and the plurality of second connection ribs are arranged in a circumferential direction in a spatial staggered manner.

In another aspect of the present invention, a base frame of a combustible sky lantern includes a combustion carrier and a envelope-connecting rim. The combustion carrier combustion carrier is used for positioning fixedly a combustible object. The envelope-connecting rim, connected with the combustion carrier, is to connect fixedly a combustible hot air balloon. After a fire at the combustible object spreads to the combustion carrier, the fire would further spread orderly to the envelope-connecting rim and the combustible hot air balloon.

In one embodiment of the present invention, the combustion carrier includes a central holder, a plurality of first connection ribs and a ring section. The central holder has a combustion positioner for positioning fixedly the combustible object. The plurality of first connection ribs are connected individually with the central holder. The ring section, surrounding the central holder, is connected with the plurality of first connection ribs and the envelope-connecting rim in a manner of locating between the plurality of first connection ribs and the envelope-connecting rim.

Preferably, the plurality of first connection ribs integrate the central holder and the ring section as a unique piece. The combustion positioner is formed as a cone-shaped structure for piercing the combustible object. The envelope-connecting rim includes an annular edge frame and a plurality of second connection ribs. The annular edge frame is connected with the combustible hot air balloon. The plurality of second connection ribs are connected with the annular edge frame and the ring section in a manner of locating between the annular edge frame and the ring section.

Further, the plurality of second connection ribs integrate the annular edge frame and the ring section as a unique piece; each of the plurality of first connection ribs has a first width, each of the plurality of second connection ribs has a second width, and the first width is greater than the second width; and, the plurality of first connection ribs and the plurality of second connection ribs are arranged in a circumferential direction in a spatial staggered manner.

As stated, in the combustible sky lantern of the present invention, a combustion carrier is introduced to locate fixedly the combustible object, the combustion carrier is further connected with the envelope-connecting rim, and the envelope-connecting rim is further connected with the combustible hot air balloon. Thereupon, a fire of the combustible object can spread from the combustion carrier outward to the envelope-connecting rim, and further to the combustible hot air balloon connected with the envelope-connecting rim, such that the combustible sky lantern can be almost burned out in the sky with less ashes or residue thereof falling back to the ground.

All these objects are achieved by the a combustible sky lantern and a combustible base frame of the combustible sky lantern described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a combustible sky lantern and a combustible base frame of the combustible sky lantern. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
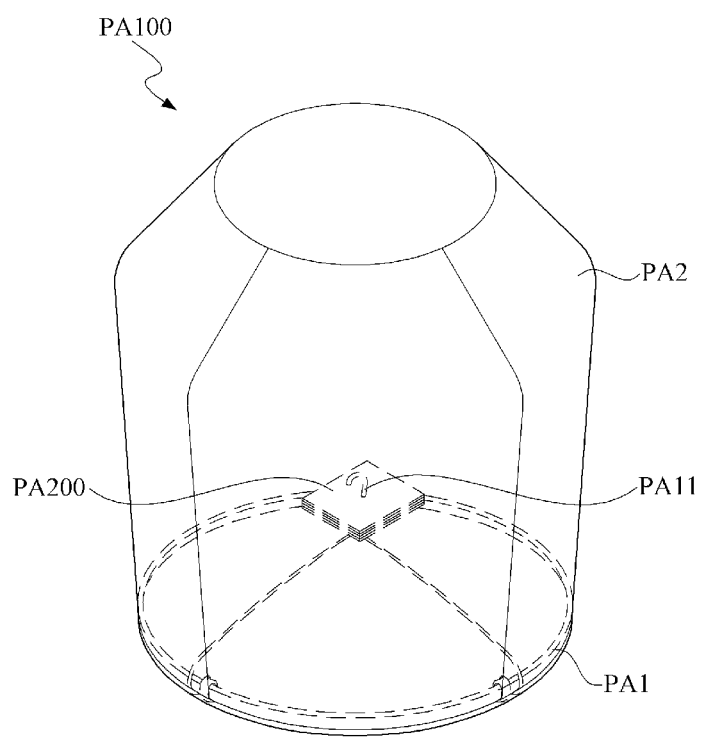
FIG. 1 is a schematic perspective view of a typical sky lantern in the art.
Figure 2:
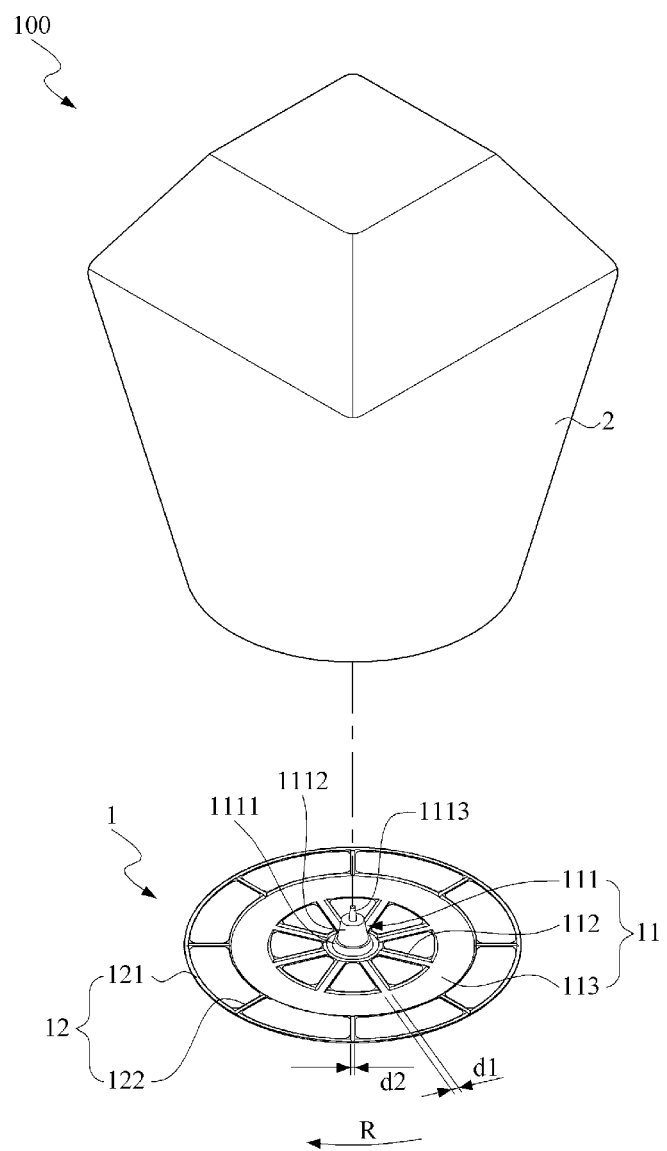
FIG. 2 is a schematic exploded view of a preferred embodiment of the combustible sky lantern in accordance with the present invention.

Referring now to FIG. 2, a schematic exploded view of a preferred embodiment of the combustible sky lantern in accordance with the present invention is provided. As shown, the combustible sky lantern 100 includes a combustible base frame 1 and a combustible hot air balloon 2.

The combustible base frame 1 includes a combustion carrier 11 and an envelope-connecting rim 12. The combustion carrier 11 includes a central holder 111, a plurality of first connection ribs 112 (one labeled in the figure) and a ring section 113. The central holder 111 includes a holder base 1111, a holder body 1112 and a combustion positioner 1113. The holder body 1112 as a protrusion from the holder base 1111 is preferably integrated as a unique piece with the holder base 1111. The combustion positioner 1113 is further structured on top of the holder body 1112, and integrated also with the holder body 1112 as a unique piece. Preferably, the combustion positioner 1113 is formed as a cone-shaped structure.

Each of the first connection ribs 112 is to connect the holder base 1111 of the central holder 111 and the ring section 113. As shown, the plurality of first connection ribs 112 protrude outward by surrounding the central holder 111 in a radial equal-spaced manner, and are integrated with the central holder 111 as a unique piece. The ring section 113 surrounding the central holder 111 preferably in a concentric manner connects as a unique piece with each of the plurality of first connection ribs 112.

The envelope-connecting rim 12 includes an annular edge frame 121 and a plurality of second connection ribs 122 (one labeled in the figure). The annular edge frame 121 is to engage the combustible hot air balloon 2, and each of the plurality of second connection ribs 122 is to connect the outer annular edge frame 121 and the inner ring section 113 in a unique-piece manner In particular, the plurality of second connection ribs 122 surrounding concentrically the ring section 113 in another radial equal-spaced manner are integrated as a unique piece with the ring section 113. Namely, the plurality of second connection ribs 122 are extended radially and distributed evenly between the outer annular edge frame 121 and the inner ring section 113. Spatially, the plurality of first connection ribs 112 and the plurality of second connection ribs 122 are both spanned in a circumferential direction and preferably arranged in a staggered manner.

In addition, in this embodiment, each of the first connection ribs 112 has a first width d1, each of the second connection ribs 122 has a second width d2, and the first width d1 is greater than the second width d2.

Figure 3:
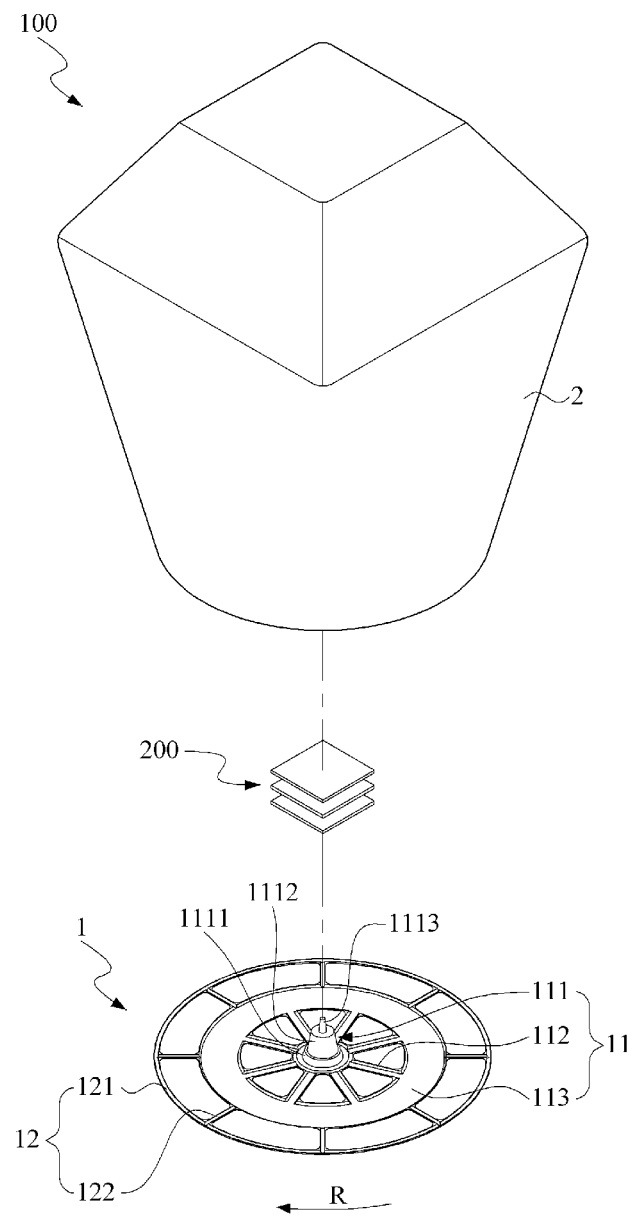
FIG. 3 demonstrates schematically a position of a combustible object at the combustible sky lantern of FIG. 2.
Figure 4:
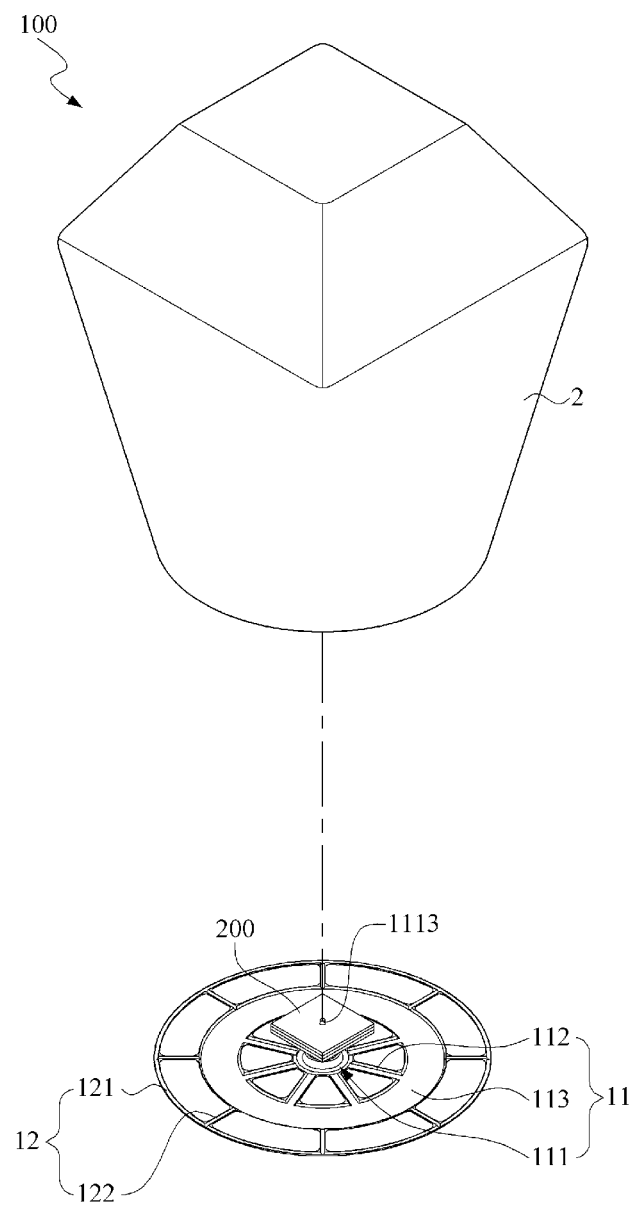
FIG. 4 demonstrates schematically another state of FIG. 3 with the combustible object to be mounted at the combustion positioner of the holder body.
Figure 5:
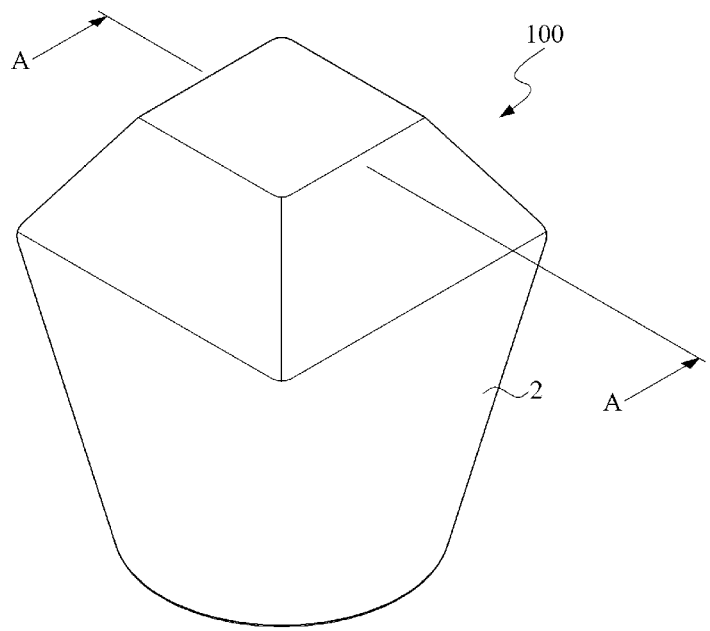
FIG. 5 is a schematic perspective view of FIG. 2.
Figure 6:
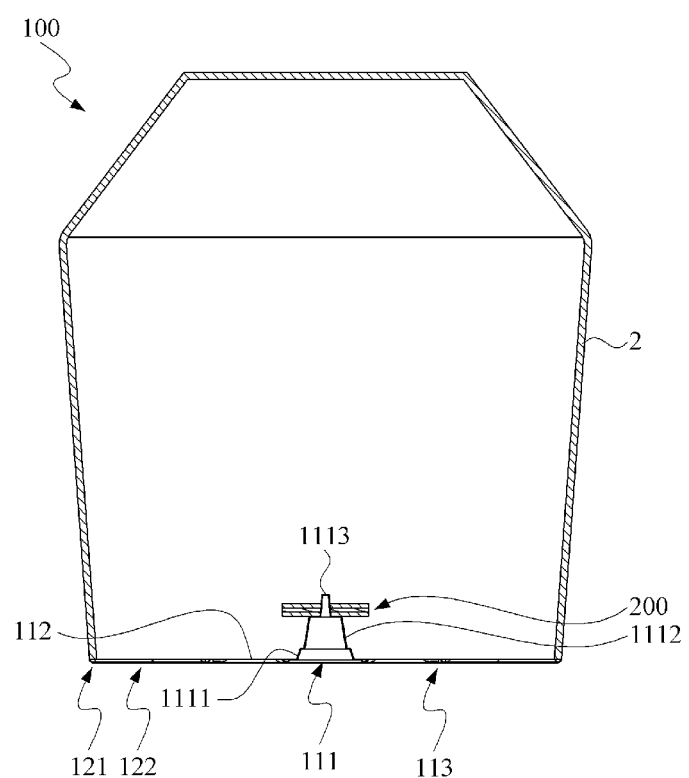
FIG. 6 is a schematic cross-sectional view of FIG. 5 along line A-A, including the combustible object.

Refer now to FIG. 3 through FIG. 6; where FIG. 3 demonstrates schematically a position of a combustible object at the combustible sky lantern of FIG. 2, FIG. 4 demonstrates schematically another state of FIG. 3 with the combustible object to be mounted at the combustion positioner of the holder body, FIG. 5 is a schematic perspective view of FIG. 2, and FIG. 6 is a schematic cross-sectional view of FIG. 5 along line A-A including the combustible object.

As shown, in this embodiment, the combustion positioner 1113 is shaped as a cone-shaped structure ready to pierce a combustible object 200 to be ignited as a flame source, so that the combustible object 200 can be easily loaded onto the holder body 1112. The combustible hot air balloon 2 is connected, at a bottom opening thereof, to the annular edge frame 121. Practically, the step of loading the combustible object 200 onto the combustion positioner 1113 can be performed before of after the combustible hot air balloon 2 is connected with the annular edge frame 121. In the case that the combustible object 200 is loaded to the combustion positioner 1113 after the combustible hot air balloon 2 is connected with the annular edge frame 121, then at least one spacing between the second connection ribs 122 shall be particularly formed to allow the combustible object 200 to pass therethrough.

In the present invention, the combustible object 200 can be a fake paper money or any combustible object, and the combustible hot air balloon 2 can be pasted to the annular edge frame 121. In addition, In some other embodiments, the combustion positioner 1113 can be furnished with a tailhook structure, or formed as a clamp structure, for better securing and stabilizing the connection with the combustible object 200 thereon.

Figure 7:
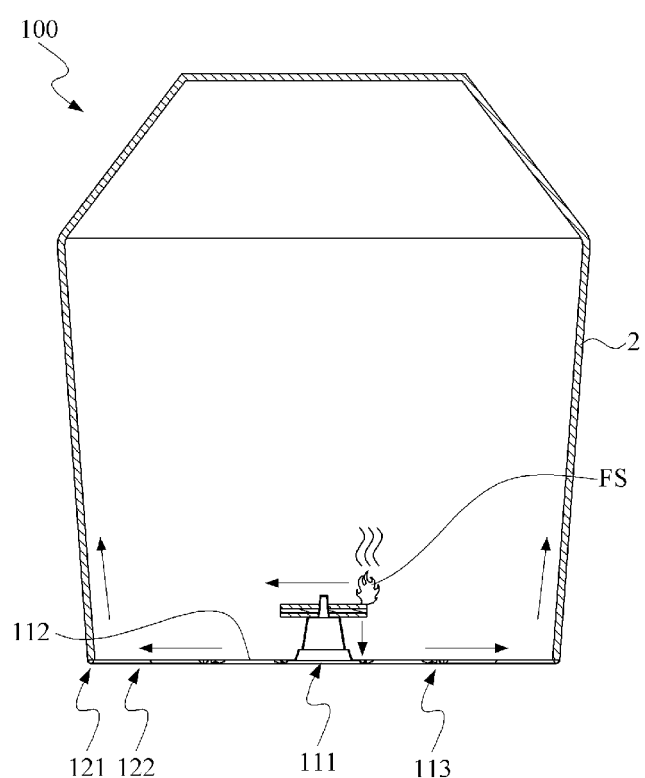
FIG. 7 is a further state of FIG. 6 with the combustible object ignited in the combustible sky lantern.

Referring now to FIG. 7, a further state of FIG. 6 with the combustible object ignited in the combustible sky lantern is provided schematically. As shown, as the combustible object 200 is ignited inside the combustible hot air balloon 2, the air thereinside would be heated up by the burning combustible object 200. Since a density of the heated air inside the combustible hot air balloon 2 is lower than that of the cool air outside the combustible hot air balloon 2, thus the entire combustible sky lantern 100 can be lifted up to the sky.

Of course, when a flame FS of the combustible object 200 finally burned down to the holder body 1112 and the combustion positioner 1113, the flame FS would keep burning the holder body 1112, the holder base 1111, the first connection ribs 112, the ring section 113, the second connection ribs 122, and finally the annular edge frame 121 in order. Thereby, the combustible hot air balloon 2 engaging the annular edge frame 121 would be eventually ignited. Upon such an arrangement, since the combustible hot air balloon 2 is the last to catch fire, the combustible hot air balloon 2 can still provide enough buoyant forcing to fly the combustible sky lantern even when the combustible base frame 1 is burning. Thus, the height of the sky lantern can be substantially maintained before the combustible hot air balloon 2 is ignited.

In the present invention, since both the combustible base frame 1 and the combustible hot air balloon 2 are made of combustible materials such as papers (so that the fire at the combustible frame can spread to the combustible hot air balloon 2), the entire combustible sky lantern 100 would be burned down almost completely into carbons, $CO_2$ and $H_2O$, among which only the residue carbons can fall back to the earth.

In summary, in comparison with the conventional sky lantern that is consisted of the bamboo-made base frame and the paper-made envelope, the sky lantern provided by the present invention is completely made of a combustible object such as the paper, and thus the entire sky lantern would be burned out into a least amount of residue carbon to fall back to the ground. Hence, ill environmental influence therefrom can be reduced to a minimum. In addition, by having the combustion carrier to fix the combustible object according to the present invention, the fire of the combustible object can spread from the combustion carrier outward to the envelope-connecting rim, and further to the combustible hot air balloon connected with the envelope-connecting rim, such that the combustible sky lantern can be almost burned out in the sky with less ashes or residue thereof falling back to the ground.

While the present invention has been particularly shown and described with reference to a preferred embodiment, it will be understood by those skilled in the art that various changes in form and detail may be without departing from the spirit and scope of the present invention.

What is claimed is:

1. A combustible sky lantern, comprising:
   a combustible base frame, including:
   a combustion carrier for positioning fixedly a combustible object to be ignited as a flame source; and
   an envelope-connecting rim, connected with the combustion carrier; and
   a combustible hot air balloon, fixed to the envelope-connecting rim, being to contain thereinside a heated air generated by burning the combustible object;
   wherein, after a fire at the combustible object spreads to the combustion carrier, the fire would further spread orderly to the envelope-connecting rim and the combustible hot air balloon.

2. The combustible sky lantern of claim 1, wherein the combustion carrier includes:
   a central holder, having a combustion positioner for positioning fixedly the combustible object;
   a plurality of first connection ribs, connected individually with the central holder; and
   a ring section, surrounding the central holder, connected with the plurality of first connection ribs and the envelope-connecting rim in a manner of locating between the plurality of first connection ribs and the envelope-connecting rim.

3. The combustible sky lantern of claim 2, wherein the plurality of first connection ribs integrate the central holder and the ring section as a unique piece.

4. The combustible sky lantern of claim 2, wherein the combustion positioner is formed as a cone-shaped structure for piercing the combustible object.

5. The combustible sky lantern of claim 2, wherein the envelope-connecting rim includes:
   an annular edge frame, connected with the combustible hot air balloon; and
   a plurality of second connection ribs, connected with the annular edge frame and the ring section in a manner of locating between the annular edge frame and the ring section.

6. The combustible sky lantern of claim 5, wherein the plurality of second connection ribs integrate the annular edge frame and the ring section as a unique piece.

7. The combustible sky lantern of claim 5, wherein each of the plurality of first connection ribs has a first width, each of the plurality of second connection ribs has a second width, and the first width is greater than the second width.

8. The combustible sky lantern of claim 5, wherein the plurality of first connection ribs and the plurality of second connection ribs are arranged in a circumferential direction in a spatial staggered manner.

9. A base frame of a combustible sky lantern, comprising:
   a combustion carrier for positioning fixedly a combustible object; and
   an envelope-connecting rim, connected with the combustion carrier, being to connect fixedly a combustible hot air balloon;
   wherein, after a fire at the combustible object spreads to the combustion carrier, the fire would further spread orderly to the envelope-connecting rim and the combustible hot air balloon.

10. The base frame of a combustible sky lantern of claim 9, wherein the combustion carrier includes:
    a central holder, having a combustion positioner for positioning fixedly the combustible object;
    a plurality of first connection ribs, connected individually with the central holder; and
    a ring section, surrounding the central holder, connected with the plurality of first connection ribs and the envelope-connecting rim in a manner of locating between the plurality of first connection ribs and the envelope-connecting rim.

11. The base frame of a combustible sky lantern of claim 10, wherein the plurality of first connection ribs integrate the central holder and the ring section as a unique piece.

12. The base frame of a combustible sky lantern of claim 10, wherein the combustion positioner is formed as a cone-shaped structure for piercing the combustible object.

13. The base frame of a combustible sky lantern of claim 10, wherein the envelope-connecting rim includes:
   an annular edge frame, connected with the combustible hot air balloon; and
   a plurality of second connection ribs, connected with the annular edge frame and the ring section in a manner of locating between the annular edge frame and the ring section.

14. The base frame of a combustible sky lantern of claim 13, wherein the plurality of second connection ribs integrate the annular edge frame and the ring section as a unique piece.

15. The base frame of a combustible sky lantern of claim 13, wherein each of the plurality of first connection ribs has a first width, each of the plurality of second connection ribs has a second width, and the first width is greater than the second width.

16. The base frame of a combustible sky lantern of claim 13, wherein the plurality of first connection ribs and the plurality of second connection ribs are arranged in a circumferential direction in a spatial staggered manner.

* * * * *